(No Model.)　　　　　　　　　　　　　　　　　　　2 Sheets—Sheet 1.
G. J. FERGUSON.
CAR COUPLING.
No. 361,867.　　　　　　　　　　　　　　　Patented Apr. 26, 1887.
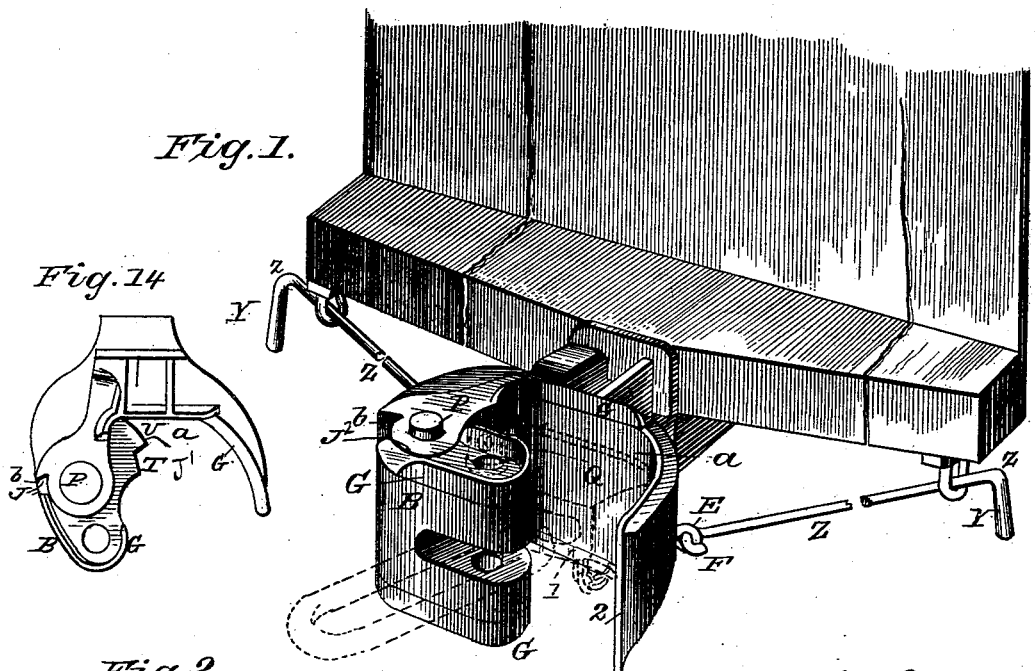
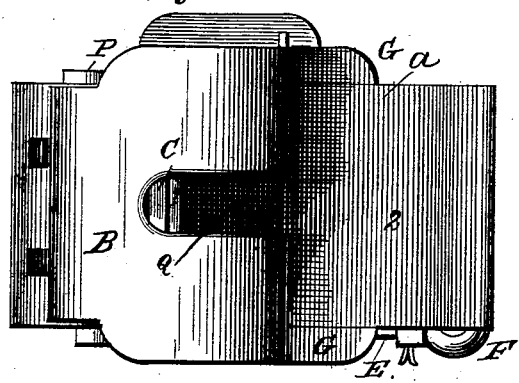
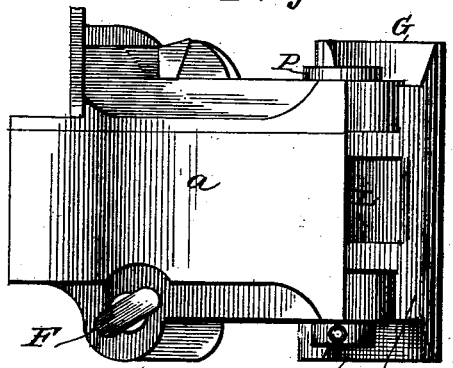
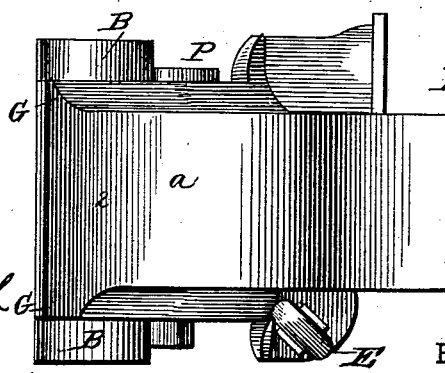
WITNESSES:　　　　　　　　　　　　　　　　　INVENTOR:
Fred G. Dietrich　　　　　　　　　　　　　　　G. J. Ferguson
P. B. Turpin　　　　　　　　　　　　　　　BY Munn & Co.
　　　　　　　　　　　　　　　　　　　ATTORNEYS.

(No Model.) 2 Sheets—Sheet 2.
G. J. FERGUSON.
CAR COUPLING.
No. 361,867. Patented Apr. 26, 1887.
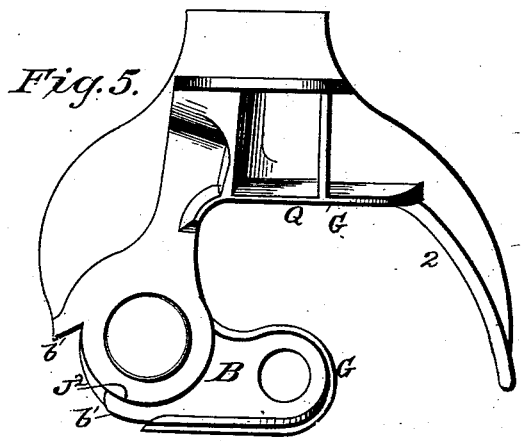
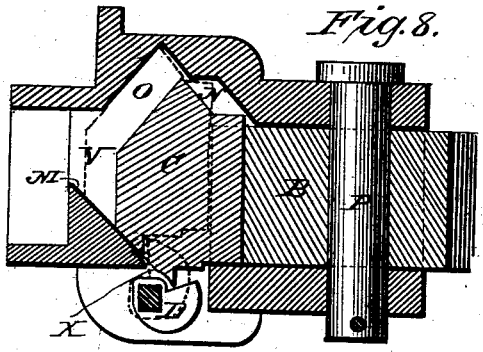
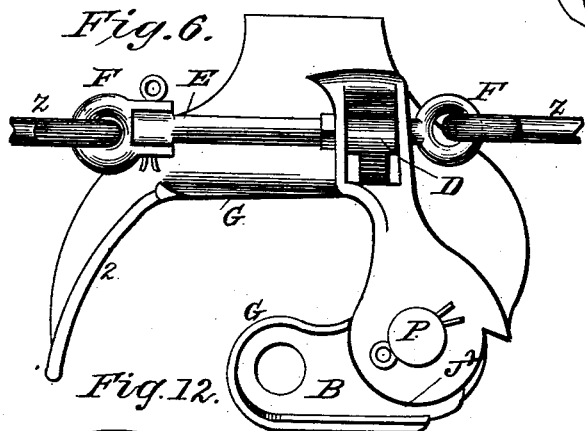
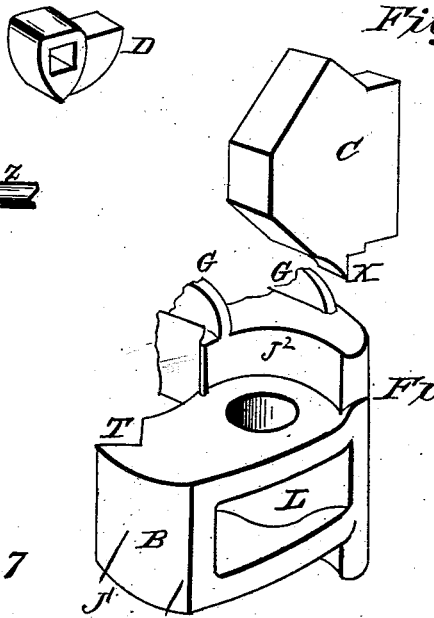
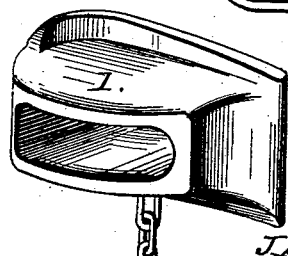
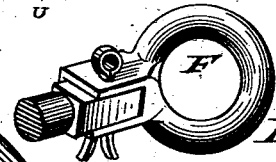
WITNESSES:
Fred G. Dieterich
P. B. Turpin
INVENTOR:
G. J. Ferguson
BY Munn & Co.
ATTORNEYS.

UNITED STATES PATENT OFFICE.

GEORGE JONES FERGUSON, OF GREENVILLE, TEXAS.

CAR-COUPLING.

SPECIFICATION forming part of Letters Patent No. 361,867, dated April 26, 1887.

Application filed August 19, 1886. Serial No. 211,335. (No model.)

*To all whom it may concern:*

Be it known that I, GEORGE JONES FERGUSON, a subject of the Queen of Great Britain, residing at Greenville, in the county of Hunt and State of Texas, have invented new and useful Improvements in Car-Couplings, of which the following is a specification, reference being had to the accompanying drawings, forming a part thereof, in which—

Figure 1 is a perspective view of my improvement in place on a car. Fig. 2 is a front view of the coupling. Figs. 3 and 4 are views of the opposite sides of the coupling. Fig. 5 is a top view. Fig. 6 is a bottom view. Figs. 7 and 8 are sectional views of the coupling; and Figs. 9, 10, 11, 12, and 13 are detail views of the parts removed; and Fig. 14 is a plan view on a reduced scale showing the coupling open.

The object of my invention is to provide an automatic car-coupling suitable for passenger and freight cars that possesses the following features: A pivoted swinging vertical hook having a short rear end or arm to permit of the solid surface, at Q, as a means of safety when coupling to a link and pin draw-head, and in both open and closed position this short rear end or arm will entirely fill the mortise or cavity it works in draw-head, so as to exclude anything that would prevent its working. This rear arm or end being short and wide precludes the possibility of its being bent, and thereby rendered unserviceable. The shape of rear arm permits of the use of socket L, which fits over projection H, and completely takes the draft-strain off hinge-pin P, thereby preventing the wear and consequent slack in this class of couplers, and also is a means of safety to prevent the parting of trains on account of the hinge-pin breaking. It also provides a large flat surface on rear part of projection H, at I, and on back inside part of recess L on hook B. These surfaces are inclined rearwardly, so that when hook is in act of coupling they draw hook back, and consequently when coupled entirely relieve hinge-pin P of all draft-strain. The hole in hook for hinge-pin is slightly slotted to permit this backward motion, and when in coupled position the large abutment-surfaces J J' J² on hook and draw-head receive the impact of the blow. It will be seen that these surfaces relieve hinge-pin P of shock when cars come together, and make draw-head as strong as if the whole were one solid piece, thereby making it unnecessary to have them constructed of an expensive grade of metal. I also provide a spring, S, contained and supported in hollow R of projection H, so it will work direct and not double up in use to open hook when closed from any cause, and also prevents vibration when cars are in motion. I also provide a locking and unlocking device constructed so it is placed entirely outside of end of car, to allow any mode of attaching draw-head to cars to be used, and making it unnecessary to change construction of car to apply my improved coupler. The solid surface Q consisting of wall W and supported by wall V takes the draft-strain of lock C when in use, making the strongest possible locking device. The unlocking device is self-retaining in uncoupled position, making it unnecessary to hook up or otherwise fasten it to set not to couple, and also allows operator to uncouple and leave cars uncoupled without their being pulled apart; but still it can be so modified that this cannot be done by simply providing a shoulder to stop-cam D at a point where uncoupling is effected, when said shoulder will prevent it from moving past its center of gravity, so that it would be self-retaining in set not to couple position.

It is entirely unnecessary for a man to go between the cars for any purpose when coupling or uncoupling my improved coupler, as each coupler can be operated from either side of car, and when set not to couple on one side can be relieved from the other, and spiral spring S will throw hook B open when closed by simply turning uncoupling-handle Y at corner of car, and thereby unlocking coupler, and will couple with one or both hooks open, and will uncouple by unlocking one hook, and will at the same time be constructed so it can be safely coupled to a link-and-pin coupler, there being a solid surface, Q, immediately in rear of link-socket to stop and hold link in a favorable position for coupling by hand, this construction being made possible by hook having a short rear end. This new feature in my coupler is essential to the safety of men, as they will require to couple by hand so long as link-couplers are in use. It also allows all of the working parts to be placed outside of end of car, so that any connection to car can be used, and also provides a locking device that is placed entirely outside of end of car, and which is self-adjusting to set lock-block in position not to couple without being hooked up or otherwise fastened.

To couple it is necessary for one hook to be open, when it will enter between other hook and guide arm 2, which will gradually turn it to coupled position, when lock-block C will drop in front of rear part of hook B, at T, and effect the coupling. This construction also allows the coupling or uncoupling on any curve with ease, and also permits the coupling of cars of a great difference of height, and will dispense with the use of both link and pin, and will be constructed so it can be safely coupled with them, as the portion of draw-head a behind link-socket at I is solid both in open or closed positions. The construction will also allow all slack deemed necessary, or can be made without any slack by inclined surface I on projection H drawing hook B back in act of coupling.

Another object of my invention is to provide an automatic vertical hook car-coupler that will couple safely to old link-and-pin couplers, and that will have all of the working parts outside of end of car, and that will have a self-adjusting set not to couple locking device that can be operated from either corner of car, and also can be simply arranged to be operated from roof of car.

The solid abutment I, against which the link strikes when making a coupling with an old link-and-pin coupler, will enable a man to couple just as safe to a link-and-pin coupler as two link-and-pin couplers couple to each other. This solid abutment I is supported by wall V, and extends from top to bottom of draw-head, making a smooth surface to allow draw-heads to play freely vertically when cars are moved over rough track, or when of different height. The construction also prevents any one from putting or anything dropping in draw-heads that would prevent them from working or coupling, as the rear part of the hook B entirely fills the space it works in either in open or closed positions.

The vertical hook B is made short at its rear end, so it can sustain a hard blow, and the metal is distributed over a large surface, to act as a brace to prevent it from being bent, and at the same time permits of the solid surface on draw-head at Q. This construction also allows all of the working parts to be placed outside of the end of the car, so that any arrangement for attaching draw-head to car can be used. It is also constructed so draft is sustained by a projection, H, on inside of draw-head, which is so shaped that when vertical hook B closes in coupling this projection H engages in a recess, L, in back of hook B, and is beveled or inclined at I, so as to draw hook B back in the act of closing or coupling and take the draft-strain off hinge-pin P, so hinge-pin P could be removed after the coupling is made without affecting the coupling or causing it to uncouple. The hole in hook through which pin P passes is made slightly slotted, to allow surface I on projection H to draw hook back in act of closing or coupling. This construction will prevent the wear of hinge-pin P, and thereby prevent the slack through the wear and friction of these parts, which is so detrimental in this class of couplers. This projection H is made hollow at R, to allow the insertion of a direct-acting spiral spring, S, which will throw the vertical hook B open after having been coupled to a link and pin draw-head, or when closed from any cause, and when coupled will prevent vibration and consequent wear of lock C and rear part of hook B at T by keeping rear part of hook at T bearing against lock-block C.

The lock-block C is constructed so that when uncoupled it is held back by rear part of hook B at U, and, consequently, it has only to drop in place and lock hook B, and has not got to recover from the shock of being driven back out of the way of rear part of hook B and after hook passes to drop in place. Lock-block C rests on an incline surface, M, that allows it to drop down, and at the same time projects it forward to engage rear part of hook B at T.

Lock-block C is supported by internal walls, V V, and the strain comes directly on cross-wall W of draw-head, which makes the strongest lock possible.

Notch T in rear part of hook is for the purpose of allowing lock-block C to be placed to one side, so that link, when working with old-style coupling, will not strike and batter lock-block, and at the same time permit of the solid surface Q, supported by internal wall V, and also prevents the link from driving lock-block back, as it is only flush with part of hook at side of link-socket.

Lock-block C has a projection at x on bottom, against which uncoupling-cam or eccentric D bears in uncoupling to carry lock-block C back at the same time it forces it up to uncoupled position, and when in this position it is not necessary to fasten it to keep it from coupling, as the cam D will be past the center of its bearing, and consequently gravity will keep it from dropping forward to position to allow lock to engage rear part of hook B and couple inclined surfaces on front at N and rear at O, at top of lock C, to assist in preventing cam D from moving forward and down, as they prevent lock-block from moving forward or backward, and thereby assisting cam D to retain its position. This is a very important adjustment, as trainmen have not time to hook up or otherwise fasten coupling in uncoupled position when doing their work.

In my invention you simply turn a handle, Y, forward and up to uncouple, or set not to couple, and vice versa to couple.

The uncoupling-rods Z are connected to stem E, that works cam D by loop or eyes F, which make a simple universal joint, and are extended to corner of car and bent to form a crank and simply fastened to corner of car by an eyebolt screwed in under side of end sill of car, and will allow the free motion of draw-head without deranging the uncoupling attachments.

My draw-heads have flanges G projecting upward and downward to increase the friction-surface with as little metal as possible. This increase of surface allows of the coupling of cars when of different heights.

Stop-abutments J J' J² are made to receive the full force of the blow. When a link-and-pin draw-head strikes hook B, this stop-abutment J is in circular form, conforming to concentric rear end or abutment, J', of the hook, the hinge-pin P being the center, which pin is also the center of the abutment J², which bears back against the curved front or hinge surface of the draw-head A". This, together with the short rear end of vertical hook B at J', prevents it from being bent in use, like other couplings of this class. Surface J' bears against surface J in coupled position.

Shoe 1, attached to bottom of draw-head $a$, is intended to be used in a vertical-hook car-coupler, to prevent link from being driven back or sidewise by placing it behind link before making the coupling, and when coupling is made it can be left there, or it can be so constructed that it will drop out when draft-strain is applied. The hook B is stopped when wide open by a shoulder, $b$, thereon engaging a shoulder, $b'$, on the draw-head, as clearly shown.

The uncoupling-rods Z are so placed on car that they are out of the way of load, and thereby not liable to get broken or damaged, and the same rods will work on any kind or class of car, either box, stock, coal, or flat car or passenger-coach.

The lock-block C is applied through lateral mortise when hook B is removed by being turned back until top part of block C will turn up to working position, and then by applying hook B lock-block C will be held in working position by rear part of hook B at U.

Having thus described my invention, what I claim as new, and desire to secure by Letters Patent, is—

1. The combination of the draw-head having a mortise, and the pivoted hook having a rear extension formed to fit in said mortise, and having the rear edge of such extension curved approximately in the arc of a circle struck from the pivot of the hook, such rear edge of the extension being rested and movable against the outer edge of the rear wall of the draw-head mortise, whereby there will be no open space in any position of the hook, substantially as set forth.

2. The combination of the draw-head having a projection, H, and the pivoted hook having a rear extension, and provided in such extension with a socket adapted to receive the projection H, substantially as set forth.

3. In a car-coupling, the combination of a draw-head having guides for the lock C, the lock C, movable in said guides, and the hook having its rear end, J², curved in the arc of a circle struck from the pivot of hook to answer the double purpose of an abutment when rested against surface J of draw-head, and of a means of securing lock back in all open positions of the hook, all being constructed as and for the purpose described.

4. In a vertical-hook car-coupling, the combination of the hook having a link-socket, and a short rear end to permit of the solid smooth surface Q in rear of link-socket, and solid surface Q being increased vertically by flanges G on draw-head and hook, as and for the purpose described.

5. In an automatic car-coupler, the combination, with the lock, of the pivoted vertically-moving cam D, arranged to engage the lock and movable past its pivoted center, whereby it will be self-retaining in uncoupled position, substantially as set forth.

6. A vertical-hook car-coupling having a short rear end, and abutments or stop-shoulders J J' J², adapted to receive the direct force of impact in meeting a link and a link-and-pin coupling, and to receive the shock in the contact of two couplings constructed so there is a solid surface at Q, supported by wall V to stop link, and extending from top to bottom of draw-head, as described, and substantially as set forth.

7. The stop-abutment J, in combination with a vertical hook having a short rear end, and having a solid surface, Q, supported by wall V, substantially as set forth.

8. In an automatic car-coupler, the combination of a pivoted hook provided with a recess, L, the draw-head having a projection, H, fitted to enter recess L and to sustain the draft, and having a hollow center, R, to contain and support spiral spring S, and the spring S, whereby to open the hook and to prevent vibration, as and for the purpose described.

9. The combination of a vertical hook having a short rear end, and a gravity locking device, C, having inclined surface at M, to project lock-block C forward, and inclined surface at N to guide lock-block in both upward and downward movement, and inclined surface at O to assist in holding lock-block in set not to couple position, and to prevent lock-block C from tilting back when moved to uncoupled position by cam D, as and for the purpose described.

10. The combination of the coupling-hook, the gravity-lock, the cam D, the shaft E, loops or eyes F, and rods Z, substantially as and for the purposes specified.

11. The combination of the draw-head having a lateral mortise, and provided with projection H, having inclined surface I, and provided with link-socket, and a solid surface, Q, in rear thereof, and also having inclined surfaces M N O, the hook having a portion adapted to close the lateral mortise of the draw-head, the flanges G, the gravity-lock C, and the spiral spring S.

12. In a car-coupling having a pivoted hook and a link-mortise, a shoe, 1, adapted to be inserted in rear of such link-mortise, substantially as and for the purposes specified.

13. The combination of the draw-head having a lateral mortise, and the vertical hook having short rear end pivoted to the draw-head, and having a portion fitted to close the outer end of said lateral mortise in the several positions of the hook, substantially as and for the purposes set forth, and having the abutments J J' J².

14. The combination of the draw-head and the hook pivoted thereto, and having a short rear end and a shoulder, T, of the lock-block C, supported in said draw-head and movable into engagement with the shoulder T, the draw-head being provided with inclined bearings M N O for said lock-block, all placed outside of end of car, substantially as set forth.

15. The combination of the draw-head having a projection, H, extended therefrom, and inclined on its rear surface, I, rearwardly toward its outer end, and the pivoted hook having a mortise or cavity to receive the projection H, the opening of the pivot-pin of said hook being slightly enlarged to allow surface I to draw the hook back in the act of coupling, substantially as set forth.

16. The combination of the draw-head having projection H, and the hook having short rear end pivoted to the draw-head, and abutments J J' J², and having a socket in rear of hook adapted to fit over projection H, substantially as set forth.

GEORGE JONES FERGUSON.

Witnesses:
J. E. GOULD,
H. H. WOLF.

Corrections in Letters Patent No. 361,867.

It is hereby certified that in Letters Patent No. 361,867, granted April 26, 1887, upon the application of George Jones Ferguson, of Greenville, Texas, for an improvement in "Car-Couplings," errors appear in the printed specification requiring the following correction, viz: In lines 20, 35, and 40, page 2, strike out the reference letter "I" and insert $Q$ instead, and line 70, page 3, strike out the reference letter "$J^2$" and insert $J'$ instead; and that the said Letters Patent should be read with these corrections therein that the same may conform to the record of the case in the Patent Office.

Signed, countersigned, and sealed this 24th day of May, A. D. 1887.

[SEAL.]

D. L. HAWKINS,
*Acting Secretary of the Interior.*

Countersigned:

BENTON J. HALL,
*Commissioner of Patents.*